Patented Jan. 6, 1953

2,624,721

UNITED STATES PATENT OFFICE 2,624,721

CURABLE ORGANO-SILICON COMPOSITIONS

David B. Hatcher and Raymond H. Bunnell, Toledo, Ohio, assignors to Libbey-Owens-Ford Glass Company, Toledo, Ohio, a corporation of Ohio No Drawing. Application September 22, 1948, Serial No. 50,664

18 Claims. (Cl. 260—46.5)

The invention relates to the production of organosilicon compositions of the curable or convertible type.

The usual starting material for the production of organo-silicon compositions of the curable type is a mixture of silanes each of whose molecules consists of a silicon atom to which are attached four monovalent radicals, some of which are readily hydrolyzable and the others of which are joined to the silicon atom through carbon atoms. Hydrolysis of such a mixture of silanes replaces each hydrolyzable radical with a hydroxy radical, and the hydrolysis ordinarily is accompanied by condensation of part of the hydroxy radicals. In such condensation, a hydroxy radical connected to one silicon atom condenses with a hydroxy radical connected to another silicon atom to form an oxygen linkage between the two silicon atoms, with the production of one molecule of water as a by-product.

Curable organo silicon compositions produced by the hydrolysis (with partial condensation) of such a mixture of silanes can be used in coating, impregnating and laminating operations like other curable condensation products, although curable organo-silicon compositions are superior to other curable condensation products in heat resistance and other properties. During the curing of an organo-silicon composition which is carried out to produce a finished coating, laminate or other product, the condensation of the hydroxy radicals is substantially completed to produce an infusible heat-resistant silicone resin.

United States Patent No. 2,381,002 describes certain substances whose molecule consists of two or more silicon atoms which are connected by hydrocarbon radicals and to each of which are attached hydrolyzable radicals. Silicone resins of the type hereinbefore described are stated by the patent to be obtainable from such substances "either alone or in admixture with other organosilicon halides such as methyl silicon chlorides, phenyl silicon chlorides, etc." However, when attempts were made to prepare silicone resins by hydrolysis of such substances, it was found to be extremely difficult to control the hydrolysis of such substances either alone or in admixture with large proportions of methyl silicon chlorides. It was found that in such hydrolysis the presence of even a small proportion of such substances caused rapid and uncontrollable gelling so that the hydrolysis produced a worthless gel.

The principal object of the invention is the controllable hydrolysis of a mixture of an alkyl silicon chloride and a substance whose molecule consists of two or more silicon atoms which are connected by hydrocarbon radicals and to each of which are attached hydrolyzable radicals, to produce valuable silicone resins. More specific objects and advantages are apparent from the description, which discloses illustrations but is not intended to limit the scope of the invention.

The hydrolysis of pure diethyldichlorosilane (with condensation) produces a non-curable oil. United States Patent No. 2,258,220 discloses the production of curable compositions by hydrolysis of a mixture of an ethyltrihalosilane with a diethyldihalosilane. However, it has been found that the curable compositions whose production is disclosed in that patent have serious disadvantages. Coatings made of such compositions are subject to severe cracking and crazing. The cracking of such coatings may be due to excessive shrinkage upon condensation or to the fact that the diethyldihalosilane upon hydrolysis tends to form cyclic condensation products which are volatile and evaporate during the curing of the composition. The loss of cyclic condensation products by evaporation tends to cause shrinkage and cracking and leaves a resin which because of its low ethyl-to-silicon ratio is excessively brittle.

The present invention is based upon the discovery that, in spite of the fact that the addition to a mixture of methylchlorosilanes of even a small proportion of a substance whose molecule consists of two or more silicon atoms which are connected by hydrocarbon radicals and to each of which are attached hydrolyzable radicals renders the hydrolysis of the mixture uncontrollable so as to make impossible the production of useful resins, the addition of such a substance to ethylchlorosilanes does not render uncontrollable the hydrolysis of the silanes but, on the contramary, produces an important improvement in the quality of the silicone resin that is formed by hydrolysis of the silanes.

In the practice of the present invention, curable organo-silicon compositions of improved quality are produced by a method that includes subjecting to condensation a composition comprising products of the hydrolysis of (1) a substance whose molecule consists of a silicon atom to which are attached four monovalent radicals from one to three of which are ethyl and from one to three of which are hydrolyzable radicals; and (2) a substance whose molecule consists of from two to three silicon atoms which are connected by from one to three divalent hydrocarbon radicals and which have their remaining free valences attached to monovalent hydrolyzable radicals, any substituent on each such divalent hydrocarbon radical consisting of a single chloro group.

It has been discovered that a curable composition embodying the invention, which is a modified ethyl silicone, produces clear, crack-free coatings which cure faster and are more flexible than coatings made from an unmodified curable ethyl silicone.

Condensation of the products of the hydrolysis of a silane or mixture of silanes having, attached to the silicon atom in the silane molecule, four monovalent radicals consisting of from one to three ethyl radicals and from one to three hydrolyzable radicals results in a greatly improved material when, in the practice of the invention, the products of the hydrolysis of a second substance whose molecule consists of from two to three silicon atoms which are connected by from one to three divalent hydrocarbon radicals, the remaining free silicon valences being attached to monovalent hydrolyzable radicals, are present before condensation. Thus, the second substance, hereinafter called an "organic cross-linked silane" may have the general formula

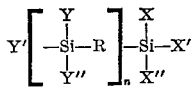

or

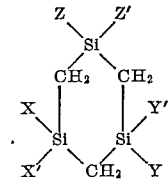

wherein $n$ is an integer from 1 to 2, R is a divalent hydrocarbon radical which is unsubstituted or substituted with a single chloro group, and each of the radicals X, X', X'', Y, Y', Y'', Z and Z' is a hydrolyzable radical. The first substance, hereinafter called an "ethylsilane," has the general formula $(CH_3CH_2-)_mSi(-Y)_{(4-m)}$ wherein $m$ is a number from one to three, and Y is a hydrolyzable radical.

"Hydrolyzable radical" is used herein to include halo, alkoxy, amino, aroxy, acyloxy and hydrogen. The halo radical is any one having an atomic weight less than 80 (i. e., fluoro, chloro or bromo). The alkoxy radical is any primary or secondary alkoxy radical having from one to four carbon atoms (i. e., methoxy, ethoxy, propoxy, isopropoxy, n-butoxy, isobutoxy or secondary butoxy). Amino is simply the —NH₂ group. Aroxy radicals are any in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- or tri-methyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula

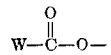

wherein W is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described. The hydrolyzable radicals in the ethylsilane or cycloaliphaticsilane molecule may be the same or different. The preferred hydrolyzable radicals are chloro groups.

R may be a divalent radical which can be considered to be derived (by the removal of two hydrogens) from the molecule of a straight or branched chain, saturated aliphatic hydrocarbon having from one to 18 carbon atoms. Thus R may be methylene, ethylene, propylene, any butylene, or any other alkylene radical, or a polymethylene radical from trimethylene to octadecamethylene.

R also may be a divalent radical which can be considered to be derived (by the removal of two hydrogens) from the molecule of a cycloalkane. R may be derived from cyclopentane, cyclohexane, or an alkylated cyclopentane or cyclohexane, or from a substance in which two carbon atoms in the ring of cyclopentane or cyclohexane or an alkylated cyclopentane or cyclohexane are common to the ring of another such cycloalkane. When R is such a radical that it can be considered to be derived from an alkylated cyclopentane or cyclohexane the alkyl radicals attached to each ring may each have from one to six carbon atoms, may have straight or branched chains, and may be from one to two in number (i. e., each alkyl radical may be methyl, ethyl, propyl, isopropyl, n-butyl, isobutyl, secondary butyl, tertiary butyl or a primary, secondary or tertiary alkyl radical having five or six carbon atoms).

R also may be a divalent radical derived (by the removal of two hydrogens) from the molecule of an aromatic hydrocarbon. When R is derived from an aromatic hydrocarbon it is usually economically desirable that it be derived from benzene, or naphthalene, from an alkylated benzene or naphthalene, or from the corresponding partially hydrogenated compounds. When R is such a radical that it can be considered to be derived from an alkylated aromatic compound, the alkyl radicals may each have from one to six carbon atoms, may have straight or branched chains, and may be from one to two in number, as hereinbefore described.

R also may be a divalent radical which can be considered to be derived (by the removal of two hydrogens) from a mono-chlorinated aliphatic hydrocarbon, a mono-chlorinated cycloalkane or alkylated cycloalkane, or a mono-chlorinated aromatic hydrocarbon.

It is usually preferable that R be unchlorinated and contain not more than 18 carbon atoms.

In the practice of the invention it is usually desirable to use a mixture of two or more ethylsilanes. A preferred embodiment of the invention involves the hydrolysis of a composition comprising a hydrolyzable diethylsilane.

It has been found that the best results are obtained when the hydrolysis products of an ethylsilane composition are co-condensed with the hydrolysis products of an organic cross-linked silane in which R is such a radical that a carbon chain links the two silicon atoms. This carbon chain can be ethylene, trimethylene, tetramethylene, or the like; it can be a branched chain, such as propylene; or it can be part of a ring structure, i. e., all or part of the chain of carbon atoms joining the two silicon atoms can be part of a benzene ring, a partially hydrogenated benzene ring, or a cycloalkane ring; when only part of the chain joining the silicon atoms is part of such a ring, the rest of the chain is all or part of an alkyl side chain attached to such a ring. It is usually preferred that the chain joining the two silicon atoms be not more than six carbon atoms in length. A particularly desirable example of such an organic cross-linked silane is a trichlorosilylethylcyclohexyltrichlorosilane.

The average number of hydrolyzable radicals determines, in part, the molecular structure that results after hydrolysis and condensation of silanes. ("Average number of hydrolyzable radicals," as used herein, signifies the total number of hydrolyzable radicals attached to the silicon atoms in the molecules of the silane starting materials divided by the total number of silicon atoms therein.) The reactions which occur during the course of the hydrolysis and condensation of silanes are understood to be represented by Equations 1 and 2 below:

(1) 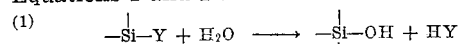

(2) 

in which Y is a hydrolyzable radical as hereinbefore described. Hydrolysis and condensation of a single silane having, attached to the silicon atom in the silane molecule, three hydrolyzable radicals yields cross-linked siloxanes; hydrolysis and condensation of a silane having two hydrolyzable radicals yields linear or cyclic siloxanes; while hydrolysis and condensation of a silane having one hydrolyzable radical yields disiloxanes. In general, in a mixture of silanes the average number of hydrolyzable groups attached to the silicon atoms determines the molecular structure of the resulting siloxanes in much the same way. Therefore, in order to obtain a curable resin it is usually desirable that the resin be derived by hydrolysis of silane compositions having an average number of hydrolyzable radicals between two and three.

As is disclosed in United States Patent No. 2,258,220 the products of the hydrolysis of ethylhalosilanes containing 1.5 ethyl radicals for each silicon atom (the maximum disclosed in the patent) "are, due to their volatility, more difficult to condense or polymerize to resinous bodies by heating at atmospheric pressure. The condensation of such more highly ethylated silicols is facilitated by effecting condensation under superatmospheric pressure." It has been found that a diethyldihalosilane upon hydrolysis tends to form cyclic condensation products which are volatile and evaporate during the curing of the composition. Since the more highly ethylated compositions are produced from mixtures containing higher proportions of a diethyldihalosilane, the formation of cyclic condensation products takes place to a greater extent in the case of the more highly ethylated compositions.

It has been found to be advantageous to condense (or polymerize) a composition comprising both products of the hydrolysis of ethylsilanes and products of the hydrolysis of organic cross-linked silanes. The resulting condensation or polymerization products cure faster, are less subject to cracking, and are more flexible than are products of the condensation (or polymerization) of the hydrolysis products of ethylsilanes. Furthermore, it has been found to be possible to produce excellent condensation or polymerization products from hydrolyzed compositions embodying the invention in which the $r/Si$ ratio is greater than 1.5. "$r/Si$ ratio," as used herein, means the total number of silicon-nonhydrolyzable radical bonds in the composition divided by the total number of silicon atoms in the composition. The $r/Si$ ratio, therefore, equals four minus the average number of hydrolyzable radicals in the silane mixture.

It should be noted that the organic cross-linking radicals in the organic cross-linked silanes (i. e., those represented by R, hereinbefore described) are not assumed to be equivalent to oxygen in an Si—O—Si linkage, although both the cross-linking radicals and oxygen form a bridge between two silicon atoms. If the cross-linking radicals were assumed to be so equivalent, the two silicon-cross-linking radical bonds of each such radical would not be considered to be silicon-nonhydrolyzable radical bonds in computing the $r/Si$ ratio, but would be counted in with the hydrolyzable bonds. One mol of an organic cross-linked silane would then be equivalent to two mols of a tetra-functional material, such as silicon tetrachloride or ethyl orthosilicate. Superior coatings can be produced by hydrolysis and condensation of organo-silicon compositions comprising such proportions of ethylsilanes and organic cross-linked silanes that the $r/Si$ ratio (so determined) is greater than 1.5. Of course, if R were thus considered to be equivalent to oxygen in determining the $r/Si$ ratio, the $r/Si$ ratio of a given composition would have a lower value than if computed by the conventional method given in the preceding paragraph.

It is possible to conduct the hydrolysis reaction simply by adding a silane or mixture of silanes to water or, in the case of silanes which are less readily hydrolyzed, to a hydrolyzing solution of an inorganic acid in water. The hydrolyzing solution can also be a water solution of a base, which hydrolyzes hydrogen-silicon bonds (such a bond is not hydrolyzed by water or by a water solution of an inorganic acid). Usually at least partial condensation (i. e., a reaction corresponding to Equation 2, above) accompanies or follows immediately the hydrolysis. However, it has been found possible to conduct the hydrolysis reaction in such a way that complete condensation does not follow immediately the hydrolysis reaction, so that liquid, hydrolyzed and only partially condensed silanes can be isolated after the hydrolysis reaction. The preferred procedure for practicing the invention involves the preparation of a mixture comprising an ethylsilane and an organic cross-linked silane and the hydrolysis and condensation of this mixture.

Examples of ethylsilanes that may be used in the practice of the invention include ethyltrifluorosilane, diethyldifluorosilane, ethyltrichlorosilane, diethyldichlorosilane, diethyldiethoxysilane, diethylchloroethoxysilane, ethyltrimethoxysilane, ethyltriethoxysilane, ethylchlorodiethoxysilane, ethyltripropoxysilane, ethyltri-n-butoxysilane and ethyltriisopropoxysilane.

Examples of organic cross-linked silanes that may be used in the practice of the invention include tri(dichlorosilylmethylene), trichlorosilylmethyldichlorosilane, trichlorosilylmethyltrichlorosilane, 1,2-bis(trichlorosilyl) ethane, 4-trichlorosilylbutyldichlorosilane, trichlorosilylethylcyclohexyltrichlorosilane, 1,6-bis-(trichlorosilyl)-hexane, 1,6-bis-(trichlorosilyl) 2,5-dimethylhexane, 1,3-bis-(trichlorosilyl) propane.

Monoethyl- or diethyl-, halo or alkoxysilanes are produced by means of a Grignard reaction between a silicon tetrahalide or alkyl orthosilicate and an ethyl magnesium halide. Such reactions proceed at a faster rate at elevated temperatures and are usually exothermic in nature. It is ordinarily desirable, therefore, to conduct the reaction in a vessel equipped with a heating coil and cooling means (e. g., a reflux condenser) so that the reactants can be heated to such a temperature that the reaction proceeds at a substantial rate, and then the maximum output of heat generated by the reaction can be removed through the cooling means. It is usually desirable to conduct the reaction in the presence of diethyl ether as a solvent; the ether has the double effect of initiating the Grignard reaction and of facilitating control of the temperature in the reaction vessel. The reaction proceeds less readily with alkoxysilanes than it does with halo-silanes so that it may be desirable to conduct the reaction between an ethyl magnesium halide and an alkyl orthosilicate under somewhat more drastic conditions than are usually desirable when the reaction is conducted with a tetrahalosilane. This is particularly true when the reaction is used to produce a diethyldialkoxysilane; in this case, it may be desirable to initiate the reaction in the presence of diethyl ether and then to supply sufficient heat to the reactor so that all the ether is distilled. The reaction is then conducted at a sufficiently high temperature that diethylation occurs readily. The magnesium salts produced during the course of the reaction are removed by filtration, and the ethylsilanes are isolated by fractional distillation of the filtrate.

Organic cross-linked silanes may be prepared by means of a reaction between a silicohaloform and an organic compound having two ethylenic-type unsaturations or by means of a reaction between a silicohaloform and an organosilane in which the organic radical has one ethylenic-type unsaturation. Also, organic cross-linked silanes may be prepared by means of a reaction between a silicon-copper contact mass and a vaporous alkylene chloride.

When a vapor phase reaction between a silicohaloform and an organic compound having two ethylenic-type unsaturations is used to produce organic cross-linked silanes, the reaction is conducted either batchwise in a bomb, or continuously by passing the reactants through a reaction zone, at an elevated temperature and under super-atmospheric pressure. When the reaction is conducted in a bomb, the silicohaloform and the organic compound having two ethylenic-type unsaturations are added to the bomb, which is then sealed and heated to a temperature at which the reaction proceeds readily, e. g., to a temperature between about 275° C. and about 400° C. When the reaction is considered to be substantially complete, i. e., from about 60 to about 150 minutes after the temperature reaches about 275° C., the bomb is cooled, and the reaction products are removed from the bomb and separated by fractional distillation through a packed column.

When the vapor phase reaction is conducted continuously the silicohaloform and the organic compound are vaporized and introduced into a heated reaction zone. The reaction is conducted so that the materials remain in the heated reaction zone long enough for substantial reaction to take place and the reaction products are then cooled and collected in condensers, the collected products being separated by fractional distillation through a packed column. The reaction is usually conducted at temperatures between about 200° C. and about 400° C., and at superatmospheric pressures as high as about 1500 pounds per square inch gauge.

It has been found that organic cross-linked silanes can be prepared by means of a liquid phase reaction between a silicohaloform and an organosilane in which the organic radical has one ethylenic-type unsaturation, for example methallyltriethoxysilane, in the presence of a polymerization catalyst, for example benzoyl acetyl peroxide. Such a reaction may be conducted in a three-necked flask fitted with a thermometer, a dropping funnel and a condenser cooled with Dry Ice, the outlet of which is equipped with a tube immersed in from five to about six inches of mercury. The flask is flushed with a dry inert gas to remove all traces of oxygen and moisture, and the silicohaloform and part of the organosilane are added to the flask through the dropping funnel. The remainder of the organosilane is mixed with the polymerization catalyst and is added dropwise through the dropping funnel to the silicohaloform-organosilane mixture in the flask. The reaction products are separated by fractional distillation through a packed column.

Organic cross-linked silanes may be prepared also by passing a vaporous alkylene halide over a heated silicon-copper contact mass, and condensing the reaction products in condensers cooled with a water-ice mixture. The cooled reaction products are separated by fractional distillation through a packed column.

Examples of organic compounds having two ethylenic-type unsaturations which can be reacted with a silicohaloform to produce organic cross-linked silanes include vinylcyclohexene-3, 2,5-dimethyl-1,5-hexadiene, 1,5-hexadiene, butadiene-1,3, isoprene, methylpentadiene, 1-bromo butadiene-1,3, pentadiene-1,3, pentadiene-1,4, hexadiene-1,3, hexadiene-1,4, 5-chlorohexadiene-1,5, hexadiene-2,4, 2-methylpentadiene-1,3, 2-methylpentadiene-2,4, 2,3-dimethyl-1,3-butadiene, 1,6-heptadiene, 2,4-heptadiene, 2-methyl-1,5-hexadiene, 2-methyl-2,4-hexadiene, 2,4-dimethyl-1,3-pentadiene, octadiene-2,6 (dicrotyl), 2-methyl-3,5-heptadiene, 2-methyl-4,6-heptadiene, 2-ethyl-2,5-hexadiene, 2,4-dimethyl-2,4-hexadiene, 2,5-dimethyl-2,4-hexadiene, 2-methyl-4,6-octadiene, 2,6-dimethyl-1,3-heptadiene, 2,6-dimethyl-1,5-heptadiene, 2-methyl-3-ethyl-1,5-hexadiene, decadiene-1,3, 2,6-dimethyl-2,6-octadiene, 2,6-dimethyl-2,7-octadiene, 3,6-dimethyl-3,5-octadiene, 4 propyl-1,4-heptadiene, cyclopentadiene, dicyclopentadiene, 1-ethyl-4-(2'-methyl-2'-propenyl) cyclohexene, 1,3-dimethyl-3-(2'-propenyl) cyclohexene, 4,4-dimethyl-2-(3'-methyl-butenyl) cyclohexene, and 1,2,2-trimethyl-3-vinylcyclopentene.

Examples of organosilanes in which the organic radical has a single ethylenic-type unsaturation that can be reacted with a silicohaloform in the presence of a polymerization catalyst to produce organic cross-linked silanes include methallyltriethoxysilane, allyltriethoxysilane, allyltrichlorosilane, p-vinylphenyltrichlorosilane, dimethallyldiethoxysilane, diallyldiethoxysilane, diallyldichlorosilane, vinyltrichlorosilane, propenyltrichlorosilanes, cyclohexenyltrichlorosilanes, butenyltrichlorosilanes, and the like.

Alkylene halides that can be reacted with a silicon-copper contact mass to produce organic cross-linked silanes include methylene chloride, ethylene chloride, trimethylene chloride, trimethylene bromide, and tetramethylene chloride.

Silanes having, attached to the silicon atom in the silane molecule, one or more amino radicals are produced by reaction between ammonia and an appropriate silane having one or more halo radicals attached to the silicon atom in the silane molecule. By such a reaction halo may be replaced by $NH_2$; ethylsilanes and organic cross-linked silanes containing amino groups as hydrolyzable radicals can be prepared by such a reaction.

Silanes having hydrolyzable radicals which consist of acyloxy groups are produced by reaction between an acid anhydride and appropriate silanes having hydrolyzable radicals which consist of alkoxy groups, or, in some instances, by reaction between an appropriate silane having hydrolyzable halo radicals and the sodium salt of the suitable organic acid.

Silanes having aroxy radicals attached to the silicon atom in the silane molecule are prepared by reaction between the corresponding halosilane and phenol or a monoalkyl-, dialkyl- or trialkyl-substituted phenol in which each alkyl substituent has from one to five carbon atoms, and all the alkyl substituents contain a total of not more than five carbon atoms as hereinbefore described.

As is indicated by Equation 1, above the hydrolyzable radicals in the ethylsilanes and organic cross-linked silanes are removed from the silane molecule by the first stage of the hydrolysis reaction and silanols are produced, at least as intermediates. Although in some instances it is possible to isolate silanols (e. g., diethylsilanediol or diphenylsilanediol) the condensation reaction (i. e., the reaction represented by Equation 2) is usually understood to take place, at least to a small extent, concurrently with or immediately following hydrolysis. In the practice of the invention the extent of the condensation reaction is controlled so that the resulting siloxane (in which different silicon atoms are attached to an oxygen atom in what is believed to be an Si—O—Si linkage) is one having the desired molecular weight and viscosity. Because the hydrolyzable radicals are removed from the silanes in the first step of hydrolysis it does not matter which hydrolyzable radical or radicals are present in the silane starting materials. The significant radical for the purposes of the present invention is —OH, and any radical that is replaced upon hydrolysis by —OH can be used in the practice of the invention. For this reason economic considerations govern the choice of hydrolyzable radicals. The least expensive and most readily available are preferred. Thus, the basis of the invention is the production of superior coatings by the condensation of a mixture of silanols composed of those having the general formulas:

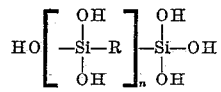

and

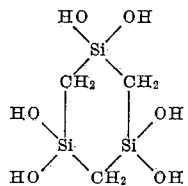

or $$HO-\left[\begin{array}{c} OH \\ -Si-R \\ OH \end{array}\right]_n \begin{array}{c} OH \\ -Si-OH \\ OH \end{array}$$

[structure showing cyclic siloxane with HO, OH groups, Si atoms and $CH_2$ bridges]

wherein the symbols have the meanings hereinbefore given.

Small amounts of silicon tetrachloride can be added to yield tetra-functional constituents. Such addition (which ordinarily should not amount to more than about 4 mol per cent of the unhydrolyzed composition) may assist in controlling the $r/Si$ ratio. It is usually desirable that the $r/Si$ ratio be at least about 1.1, and preferable that it be at least about 1.2. Ordinarily it is most desirable that the $r/Si$ ratio be at least about 1.3. It is desirable that the $r/Si$ ratio be not greater than about 2.3, and preferable that it be not greater than about 2.0. Most desirably, the $r/Si$ ratio is not greater than about 1.9.

In order to achieve appreciable improvement in the characteristics of the resulting coating it is usually desirable that the composition to be condensed be derived to the extent of at least about 1 mol per cent (based upon the total mols of silanes in the unhydrolyzed composition) from organic cross-linked silanes. It is ordinarily preferable that the composition be derived from organic cross-linked silanes to the extent of at least about 5 mol per cent, and most desirable that it be so derived to the extent of at least about 8 mol per cent. Usually, it is desirable that the composition be derived from organic cross-linked silanes to an extent amounting to not more than about 35 mol per cent, although, in some instances, it may be advantageous that it be so derived to an extent amounting to as much as 45 mol percent. Ordinarily it is preferable that it be derived therefrom to an extent amounting to not more than about 30 mol per cent, and most desirable that it be derived therefrom to an extent amounting to not more than about 25 mol per cent. Compositions derived to a large extent from organic cross-linked silanes are used when it is desired to produce films having a high $r/Si$ ratio.

In the practice of the invention two or more of the silanes hereinbefore described are hydrolyzed by addition to a hydrolyzing solution. The addition should be made at a rate sufficiently slow that the exothermic hydrolysis reaction does not cause local overheating (i. e., at such a rate that one mol of silanes is added in from about 5 to about 10 minutes). It is usually desirable, also, that the hydrolyzing solution be stirred during the silane addition; otherwise, local overheating may result in spite of a slow rate of silane addition.

The hydrolyzing agent may be water alone or (in the case of less readily hydrolyzed silanes) an aqueous solution of a mineral acid. It is sometimes desirable to use a water solution of a base, such as $NaOH$ or $NH_4OH$, as the hydrolyzing solution. Halosilanes are readily hydrolyzed by water alone, and it is often desirable to hydrolyze them with a water-ice slurry; the hydrolysis produces a hydrohalic acid which then serves as a catalyst for further hydrolysis. Amino, acyloxy and alkoxy radicals are more difficult to hydrolyze than halo radicals, alkoxy radicals being the most difficult to hydrolyze. It is usually desirable to use a dilute aqueous solution of a mineral acid as the hydrolyzing agent with silanes having hydrolyzable radicals which consist of amino, acyloxy or alkoxy radicals, although it is possible to hydrolyze these radicals with water alone. Aroxy radicals are more difficult to hydrolyze than are any of the other four so that a more drastic hydrolysis reaction is desirable; the more drastic hydrolysis reaction may be provided by a higher temperature, a stronger aqueous mineral acid solution as the hydrolyzing agent or little or no solvent (for the silanes), which serves as a diluent. The mineral acids that are used as hydrolysis catalysts include hydrochloric, sulfuric and phosphoric, hydrochloric usually being preferred. The amount of hydrolyzing solution that is used includes at least enough water to effect complete hydrolysis of the silanes (i. e., at least one gram mol of water for every two gram atoms of hydrolyzable radicals in the silane to be hydrolyzed). It is usually advantageous to use a considerable excess of water, e. g., from 5 to 10 gram mols for every two gram atoms of hydrolyzable radicals, but it is ordinarily not advantageous to use more than about 20 gram mols of water for every two gram atoms of hydrolyzable radicals. To hydrolyze the more readily hydrolyzable silanes it is often advantageous to effect the hydrolysis at a relatively low temperature. As hereinbefore described this is readily accomplished by supplying the water for the hydrolysis in the form of ice.

It is usually desirable to dissolve the silanes in a solvent. Suitable solvents include ethers such as diethyl, ethylmethyl, ethylpropyls, dipropyls, propylbutyls and cyclic ethers such as dioxane; hydrocarbon solvents such as benzene, toluene, xylenes, hexanes, heptanes, and octanes; ketones such as acetone, methylethylketone and diethylketone; and alcohols such as methyl alcohol, ethyl alcohol, propyl alcohols and butyl alcohols. In some instances, particularly with more difficultly hydrolyzable radicals, it is desirable to use a mutual solvent (i. e., a solvent for both the hydrolyzing solution and the silanes). The lower ketones and lower alcohols are such mutual solvents. In other instances it is desirable to use solvents which dissolve only the silane so that the hydrolysis is conducted in a two-phase system. Such solvents include the ethers and the higher alcohols. It is usually desirable to use a substantial amount of a solvent or solvents (e. g., from about 100 to about 300 ml. of solvents per gram mol of silanes), although in some instances (e. g., when the silane is hydrolyzable only with comparative difficulty) it is desirable to use considerably less solvent, while in still other instances (e. g., when the silane is particularly easy to hydrolyze) it is desirable to use somewhat more solvent.

It has been found that the hydrolysis is usually substantially complete within from about 5 to about 10 minutes after the addition of the silane to the hydrolyzing solution has been completed. Apparently, leaving the silane in contact with the hydrolyzing solution for longer periods of time has no deleterious effect on the resulting products.

When the hydrolysis reaction is conducted with a mutual solvent and is considered to be approximately complete, the mixture of liquids is separated into two components (e. g., by solvent extraction using a solvent which is not miscible with water, such as diethyl ether). It is usually desirable then to extract the water layer again.

When a two-phase hydrolysis reaction has been conducted (i. e., using a solvent for the silane alone) the silane layer is allowed merely to separate from the water layer (e. g., in a separatory funnel) and the water layer is drawn off and extracted with a water immiscible solvent such as diethyl ether. This extract is combined with the silane layer.

The separated solution of hydrolyzed silanes is then washed with water and dried (e. g., over such a drying agent as anhydrous calcium chloride or anhydrous sodium sulfate). The drying agent is removed (e. g., by filtration) and the hydrolyzed silanes are separated from the solvent by heating the silane-solvent mixture at atmospheric pressure. The solvent is assumed to be substantially removed when the temperature of the solution in the vessel rises materially above the boiling temperature of the solvent. It is usually desirable, after the solvent is considered to be substantially removed, to maintain the temperature of the distillation vessel at about the boiling temperature of the solvent, and to reduce the absolute pressure to about 5 inches of mercury for about 10 minutes in order to eliminate the last trace of solvent. It may be advantageous to body the resin by heating it slowly to a temperature between about 140° C. and about 160° C. and maintaining the temperature of the resin within this range for about 5 minutes in order to obtain the desired viscosity. It is usually preferable to obtain the compositions by cohydrolyzing the silanes (i. e., hydrolyzing a mixture of ethylsilanes and organic cross-linked silanes).

The hydrolysis product (after removal of the hydrolysis solvent) may be diluted with a solvent that is volatile below about 200° C. Examples of such solvents include benzene, toluene, xylene, acetone, methylethylketone, diethylketone, dioxane, higher alcohols and naphtha-type solvents. Usually it is not desirable to dilute the resin to less than about 50 per cent solids by weight, while in some instances the less viscous resins can be used without dilution, but it is usually preferable to use resins of the invention after they have been diluted to from about 60 to about 80 per cent solids. It is usually most desirable to use the resins after they have been diluted to about 70 per cent solids. The siloxane is condensed to yield an infusible composition. This condensation (or curing) is accomplished by heating a film of the siloxane to a temperature which is usually between about 150° C. and about 250° C., for a comparatively short period of time (usually between about one-half hour and about two hours).

The bodied and diluted compositions of the invention are resinous in character. They may be condensed alone by the action of heat, as hereinbefore described, or they may be used as modifying agents (i. e., condensed in the presence of other resinous materials, including organic resins, such as alkyds, and other siloxanes). The siloxanes with which the resins of the invention can be condensed include those derived by hydrolysis of such silanes as methyltrifluoro- or chloroor bromo-, dimethyldifluoro- or chloro- or bromo-, trimethylfluoro- or chloro- or bromo-, n-propyltrifluoro- or chloro-, di-n-propyldichloro-, tri-n-propylfluoro- or bromo-, isopropyltrifluoro-, n-butyltrifluoro- or chloro- di-n-butyl-difluoro-, tri-n-butylfluoro-, isobutyltrichloro-, tri-isobutylbromo-, n-pentyltrifluoro- or chloro-, di-n-pentyldifluoro-, tri-n-pentylfluoro-, methylchlorodifluoro-, methylfluorodichloro-, dimethylfluorochloro-, n-propylchlorodifluoro-, n-propylfluorodichloro-, isopropylchloro-difluoro-, isopropylfluorodichloro-, n-butylchlorodifluoro-, n-butylfluorodichloro-, isopentyltrichloro-, tri-isopentylbromo-, methyltriethoxy- or n-butoxy-, dimethyldiethoxy- or n-butoxy-, dimethylchloro-n-butoxy, trimethylmethoxy- or ethoxy- or n-butoxy-, n-propyltriethoxy-, isopropyltriethoxy-, n-butyltriethoxy-, isobutylchloromethoxyethoxy-, isopentyltriethoxy- silanes and the like. When the compositions of the invention are used as modifying agents with organic resins the diluted resins are mixed with the organic resins. When they are used with other siloxanes a mixture of the silanes can be prepared, and this mixture hydrolyzed to yield a siloxane resin embodying the invention; alternatively, a dried, hydrolyzed solution (in an extracting solvent) of a mixture of ethyl- and organic cross-linked silanes can be mixed with a dried, hydrolyzed solution of other silanes, and from this mixture can be prepared (as hereinbefore described) a siloxane resin embodying the invention.

A particularly advantageous aspect of the invention involves the condensation of a hydrolyzed composition embodying the invention together with the products of the hydrolysis of a silane having the general formula

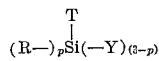

hereinafter called a cycloaliphaticsilane, wherein Y is a hydrolyzable radical as hereinbefore described, $p$ is a number from zero to one, R is an alkyl radical having from one to two carbon atoms (i. e., methyl or ethyl) and T is a saturated cycloaliphatic hydrocarbon radical having a single nucleus containing from five to six carbon atoms each of which is connected to at least one hydrogen atom, having from five to eleven carbon atoms, and having not more than three side chains containing a total of not more than five carbon atoms. Thus, T is cyclopentyl, cyclohexyl or substituted cyclopentyl or cyclohexyl. The substituents, if any, may be one, two or three in number. Not more than one substituent is bonded to any one nuclear carbon atom; each substituent is an alkyl radical having not more than five carbon atoms, the total number of carbon atoms in side chains being from one to five, as hereinbefore described. Cyclohexyltrichlorosilane, cyclohexylmethyldichlorosilane, trimethylcyclohexyltrichlorosilane and p-tertiaryamylcyclohexyltrichlorosilane are examples of cycloaliphaticsilanes.

Although cycloaliphaticsilanes have been prepared by means of a Grignard reaction between a cycloaliphatic magnesium halide and a tetrahalosilane or an alkylorthosilicate, the yield from such a reaction is comparatively low. A preferred method for preparing cycloaliphaticsilanes involves a vapor phase reaction between a cycloalkene and a halosilane. Such a reaction is conducted between a silane having, attached to the silicon atom in the silane molecule, one hydrogen atom and three other radicals, one of which may be either methyl or ethyl and the remainder of which are halo, and a cycloalkene containing the characteristic structural constituent $>C=C<$. The cycloalkene can be cyclopentene, cyclohexene or any monoalkyl-, dialkyl- or trialkyl-substituted cyclopentene or cyclohexene in which each alkyl substituent has from one to five carbon atoms, and the total number of carbon atoms in all the alkyl side chains is not more than five, as hereinbefore described. This reaction can be used to produce any cycloaliphaticsilane in which the hydrolyzable groups are halo radicals. The reaction is usually conducted at temperatures between about 200° C. and about 400° C. and at superatmospheric pressures as high as about 2,000 pounds per square inch gauge.

Compositions of the invention, when used as modifying agents, should be used in an amount sufficient to accomplish significant improvement in the characteristics of the resin being modified (e. g., siloxanes derived from the ethyl- and organic cross-linked silanes, in the proportions hereinbefore described, should usually comprise at least about 10 mol per cent of the entire composition and can be 100 per cent of the composition).

When a composition of the invention is used to modify the characteristics of a siloxane composition the $r$/Si ratio of the entire composition should be within the range hereinbefore described. The composition embodying the invention used as a modifying agent (i. e., as from about 10 mol per cent to 100 mol per cent of a coating composition) should be derived from at least about 5 mol per cent, but not more than about 45 mol per cent, of organic cross-linked silanes, the remainder being derived from ethylsilanes, as hereinbefore described.

For the purpose of computing the $r$/Si ratio, only the radicals actually hydrolyzed during the processing of the composition are considered to be "hydrolyzable radicals." For example, if the processing is carried out under such conditions that hydrogen atoms attached to silicon are not hydrolyzed, the hydrogen-silicon bonds are considered to be silicon-nonhydrolyzable radical bonds for the purpose of computing the $r$/Si ratio.

Compositions of the invention are advantageous in that they cure more rapidly than do ethylsilane compositions having about the same $r$/Si ratio. Rapid-curing compositions are desirable because a shorter curing cycle, in practical applications, results in decreased cost. Thus, a hydrolyzed ethylsilane composition having an $r$/Si ratio of about 1.4 cures after from about three to about four hours at 200° C., whereas a hydrolyzed silane composition derived from about 45.4 mol per cent of diethyldichlorosilane, 45.5 mol per cent of ethyltrichlorosilane, and 9.2 mol per cent of (trichlorosilylethyl) cyclohexyltrichlorosilanes (the $r$/Si ratio of such a mixture of silanes is about 1.41) cures after about 45 minutes at 175° C. Furthermore, the film from the latter composition is clear and flexible, whereas the film from the former composition is brittle and tends to crack upon cooling.

Films prepared according to the invention are, consequently, superior to films prepared from hydrolyzed ethylsilanes; in addition, as hereinbefore described films comprising hydrolysis products from organic cross-linked silanes can be prepared, in the practice of the invention, from silane compositions having $r$/Si ratios that are substantially higher than those that are practical when the films are prepared from hydrolyzed ethylsilanes.

*Example 1*

An organic cross-linked silane is prepared according to the following procedure:

Silicochloroform (237 grams) and a diene (81 grams of vinylcyclohexene-3) are charged into a steel high pressure bomb having a capacity of about 1100 cc., and the bomb is sealed, placed in a heating jacket, and heated, using a constant energy input sufficient to achieve a temperature of 324° C. in about 80 minutes. The temperature inside the bomb is maintained between about 320° C. and about 340° C. for 90 minutes, after which time heating is discontinued; the bomb is allowed to cool; and the product is removed from the bomb and separated by fractional distillation through a jacketed column 36 inches in length and 25 mm. in diameter, packed with glass helices. Trichlorosilylethylcyclohexyltrichlorosilanes (60 grams having a boiling temperature between about 153° C. and about 160° C. at an absolute pressure of about 4 mm. of mercury) are recovered from the reaction products.

An organo-silicon composition is hydrolyzed and cured to form superior coatings according to the following procedure: A mixture of silanes (15.2 grams of (trichlorosilylethyl) cyclohexyltrichlorosilanes and 25.1 grams of diethyldichlorosilane) is added dropwise (over a period of about 15 minutes) to a stirred hydrolyzing solution (about 100 cc. of a 50 volume per cent solution of ethanol in distilled water). When the addition of the silane mixture is complete the hydrolysis mixture is stirred for about 5 minutes and the silane layer is separated in a separatory funnel. The water layer is extracted twice with diethyl ether (about 50 cc. portions) and the ether extracts are added to the separated hydrolyzed silanes; this ether solution of silane products is dried over anhydrous calcium chloride (about 10 grams) for about one hour. The calcium chloride is removed (by filtration) from the solution of hydrolyzed silanes; the ether is distilled by heating on a steam bath until the temperature of the liquid rises a few degrees above the boiling point of the ether; and the resulting tacky, somewhat gum-like silicone is cured by heating thin films of the material on glass plates. Such films become hard and flexible after about two hours at 175° C.; there is no apparent loss of volatiles during this cure.

A film (on a glass plate) of the silicone prepared according to the procedure described in the preceding paragraph is cured to a hard, flexible condition after about 30 minutes at 175° C., but after such a cure the film is more readily subject to attack by solvents than after a longer cure, e. g., the two hours used in the procedure described in the preceding paragraph. When such a film is cured for about 16 hours at 175° C. a very hard, clear material which is somewhat brittle results. A sample of the silicone is found to form a rubbery gel when allowed to stand for about three hours at 80° C., e. g., on a steam bath, or when allowed to stand for about 10 minutes at 175° C.

*Example 2*

A mixture of silanes (15.7 grams of diethyldichlorosilane, 16.3 grams of ethyltrichlorosilane and 7.6 grams of (trichlorosilylethyl) cyclohexyltrichlorosilanes) is hydrolyzed by the procedure described in the second paragraph of Example 1. The hydrolyzed product is found to form a gel when allowed to stand for about 30 minutes at 175° C. A film of the hydrolyzed silane is cured after about 45 minutes at 175° C. to a clear, flexible, rather soft condition.

*Example 3*

A mixture of silanes (28.25 grams of diethyldichlorosilane and 6.4 grams of (trichlorosilylethyl) cyclohexyltrichlorosilanes) is hydrolyzed by the procedure described in the second paragraph of Example 1. The hydrolyzed product is found to form a gel when allowed to stand for about 70 minutes at 200° C. A film of the hydrolyzed silane is cured to a hard condition after about 16 hours at 200° C.

*Example 4*

An organic cross-linked silane is prepared according to the following procedure:

A charge consisting of finely divided magnesium turnings (107.5 grams) and an alkyl orthosilicate (1248 grams of ethyl orthosilicate) is put into a three-necked flask and the flask is then fitted with a dropping funnel, a mercury-sealed stirrer and a reflux condenser equipped with a calcium chloride tube. A "starter" consisting of a bromo-substituted hydrocarbon (2 ml. of ethyl bromide) is added to the charge (to initiate a reaction) and the flask begins to get warm. A methallyl halide (442.5 grams of methallyl chloride) is then added dropwise with stirring through the dropping funnel over a period of fifty minutes, during which time the heat of reaction causes the temperature of the charge to remain around 75–80° C. After the addition of the methallyl halide is completed, the material in the flask is heated with stirring at approximately 120° C. for one hour. The resulting reaction mixture, which contains a large amount of grayish precipitate (magnesium salts), is filtered, the filter cake is washed with an amount of benzene equal to two or three times the volume of the filtrate and the benzene is added to the filtrate. The volatile materials (e. g., benzene and bimethallyl) in the resulting filtrate are distilled off through a packed column at atmospheric pressure by heating the filtrate up to about 125° C. and the remainder of the filtrate is separated by distillation at 15–20 mm. Hg (i. e., at an absolute pressure equal to about 15–20 mm. of mercury) to obtain unreacted alkyl orthosilicate, the methallylalkoxysilanes, the usual intermediate cuts (i. e., fractions distilling at temperatures between the boiling temperature of the alkyl orthosilicate and that of the methallyltrialkoxysilane, and between the boiling temperature of the methallyltrialkoxysilane and that of the dimethallyldialkoxysilane) and a small amount of heavy oil-like liquid bottoms. The total (silane) product recovered consists of 216 grams of methallyltriethoxysilane and 60 grams of dimethallyldiethoxysilane which are found to be in a substantially pure state. The boiling point (B. P.) at reduced pressure and the index of refraction at 20° C. ($n_D^{20°}$) for the methallylethoxysilanes are as follows: (a) Methallyltriethoxysilane—B. P. 86° C. at 19 mm. Hg, $n_D^{20°}$ 1.4140; (b) dimethallyldiethoxysilane—B. P. 102° C. at 18 mm. Hg, $n_D^{20°}$ 1.4410. A silicochloroform-organosilane composition (169 grams of silicochloroform and 80 grams of methallyltriethoxysilane) is added to a one-liter, three-necked flask fitted with a thermometer, a dropping funnel and a condenser (cooled by Dry Ice) equipped with an outlet tube immersed in from about five to about six inches of mercury, which flask has been purged of air and moisture by means of dry nitrogen. The composition in the flask is warmed to about 45° C., and an organosilane-polymerization catalyst mixture (18 grams of benzoyl acetyl peroxide with 83 grams of methallyltriethoxysilane) is added dropwise to the material in the flask over a period of about 75 minutes. The material in the flask is maintained at a temperature between about 45° C. and about 55° C. during the addition of the organosilane-polymerization catalyst mixture and for about four hours after that addition is complete. An organosilane-polymerization catalyst mixture (2 grams of benzoyl acetyl peroxide with 8 grams of methallyltriethoxysilane) is added to the flask through the dropping funnel, and the material in the flask is then maintained at a temperature between about 55° C. and about 60° C. for about five hours. The reaction mixture is then cooled and separated by fractional distillation to yield silicochloroform (85 grams), methallyltriethoxysilane (75 grams) and 3-trichlorosilyl-2-methylpropyltriethoxysilane (43 grams; boiling temperature 115–122° C. at an absolute pressure of 4 mm. of mercury).

A mixture of silanes (28.25 grams of diethyldichlorosilane and 7.1 grams of 3-trichlorosilyl-2-methylpropyltriethoxysilane) is hydrolyzed by the procedure described in the second paragraph of Example 1. A film of the hydrolyzed silane is cured to a hard, fairly flexible condition after about 60 minutes at 200° C.

*Example 5*

An organic cross-linked silane is prepared according to the procedure described in the first paragraph of Example 1, using 271 grams of silicochloroform and (as the diene) 132 grams of dicyclopentadiene. The heating rate is such that the temperature of the bomb reaches about 290° C. (when the pressure is about 435 pounds per square inch gauge) approximately 70 minutes after heating is started, and about 344° C. approximately 90 minutes after heating is started. The temperature inside the bomb is maintained between about 310° C. and about 340° C. for an additional 120 minutes, after which time heating is discontinued. Fractional distillation of the product yields bis(trichlorosilyl) cyclopentanes (52 grams; boiling temperature 169° C. to 175° C. at an absolute pressure equal to 55 mm. of mercury), an intermediate cut believed to comprise trichlorosilyltetrahydro-4,7-methanoindane (33 grams; boiling range 178° C. to 206° C. at an absolute pressure equal to 4 mm. of mercury) and a third cut (55 grams; boiling range 260° C. to 295° C. at an absolute pressure equal to 4 mm. of mercury) believed to be a mixture of bis(trichlorosilyl) hexahydro-4,7-methanoindanes, i. e., the 2,5-; the 2,6-; the 3,5-; and the 3,6- products.

Results substantially the same as those described in the second paragraph of Example 1 may be obtained by carrying out cohydrolysis with ethylsilanes according to the procedure described in that paragraph using, instead of the (trichlorosilylethyl) cyclohexyltrichlorosilane, an equivalent amount of a bis(trichlorosilyl) cyclopentane.

*Example 6*

An organic cross-linked silane is prepared according to the procedure described in the first paragraph of Example 1, using 339 grams of silicochloroform and (as the diene) 125 grams of 2,5-dimethyl-1,5-hexadiene. The heating rate is such that the temperature of the bomb reaches about 372° C. approximately 80 minutes after heating is started, and the bomb is then allowed to cool slowly (over a period of about 300 minutes) to about 332° C., after which time heating is discontinued. Fractional distillation of the product yields 1,6-bis(trichlorosilyl)-2,5-dimethylhexane (64 grams; boiling temperature 165° C. at an absolute pressure within the range from 10 to 15 mm. of mercury).

Results substantially the same as those described in the second paragraph of Example 1 may be obtained by carrying out cohydrolysis with ethylsilanes according to the procedure described in that paragraph, using, instead of the (trichlorosilylethyl) cyclohexyltrichlorosilane, an equivalent amount of 1,6-bis(trichlorosilyl)-2,5-dimethylhexane.

Having described the invention, we claim:

1. A method of producing organo-silicon compositions that includes subjecting to condensation a composition comprising products of the hydrolysis of (1) a substance whose molecule consists of a silicon atom to which are attached two ethyl radicals and two monovalent hydrolyzable radicals; and (2) a substance whose molecule consists of two silicon atoms which are connected by an unsubstituted divalent hydrocarbon radical and which have their remaining free valances attached to monovalent hydrolyzable radicals; in a molar ratio from 99:1 to 55:45.

2. A method as claimed in claim 1 in which the shortest connection between the free valences of the unsubstituted divalent hydrocarbon radical is through from two to six carbon atoms in series.

3. A method as claimed in claim 2 in which the monovalent hydrolyzable radicals are chloro groups.

4. A method of producing organo-silicon compositions that includes subjecting to condensation a composition comprising products of the hydrolysis of diethyldichlorosilane and a trichlorosilylethylcyclohexyltrichlorosilane, in a molar ratio from 99:1 to 55:45.

5. A composition comprising products of the hydrolysis of (1) a substance whose molecule consists of a silicon atom to which are attached two ethyl radicals and two monovalent hydrolyzable radicals; and (2) a substance whose molecule consists of two silicon atoms which are connected by an unsubstituted divalent hydrocarbon radical and which have their remaining free valences attached to monovalent hydrolyzable radicals; in a molar ratio from 99:1 to 55:45.

6. A composition as claimed in claim 5 in which the shortest connection between the free valences of the unsubstituted divalent hydrocarbon radical is through from two to six carbon atoms in series.

7. A composition as claimed in claim 6 in which the monovalent hydrolyzable radicals are chloro groups.

8. A composition comprising products of the hydrolysis of diethyldichlorosilane and a trichlorosilylethylcyclohexyltrichlorosilane, in a molar ratio from 99:1 to 55:45.

9. A method of producing organo-silicon compositions that includes subjecting to condensation a composition comprising products of the hydrolysis of (1) a substance whose molecule consists of a silicon atom to which are attached four monovalent radicals from one to three of which are ethyl and from one to three of which are hydrolyzable radicals; and (2) a substance of the group consisting of those having one of the general formulas

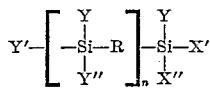

and

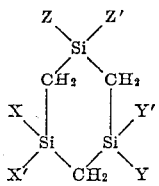

wherein $n$ is an integer from 1 to 2, R is a divalent hydrocarbon radical in which any substituent is a single chloro group, and each of the radicals X, X', X'', Y, Y', Y'', Z and Z' is a hydrolyzable radical; in a molar ratio from 99:1 to 55:45.

10. A method as claimed in claim 9 in which the composition subjected to condensation comprises products of the co-hydrolysis of the two substances.

11. A method of producing organo-silicon compositions that includes subjecting to condensation a composition as claimed in claim 9 in which the first-mentioned substance is one whose molecule consists of a silicon atom to which are attached two ethyl radicals and two monovalent hydrolyzable radicals, and the divalent hydrocarbon radicals in the second-mentioned substance are unsubstituted.

12. A composition comprising products of the hydrolysis of (1) a substance whose molecule consists of a silicon atom to which are attached four monovalent radicals from one to three of which are ethyl and from one to three of which are hydrolyzable radicals; and (2) a substance of the group consisting of those having one of the general formulas

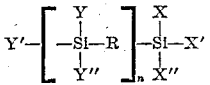

and

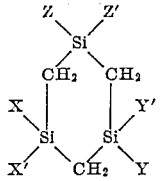

wherein $n$ is an integer from 1 to 2, R is a divalent hydrocarbon radical in which any substituent is a single chloro group, and each of the radicals X, X', X'', Y, Y', Y'', Z and Z' is a hydrolyzable radical; in a molar ratio from 99:1 to 55:45.

13. A composition as claimed in claim 12 in which the first-mentioned substance is one whose molecule consists of a silicon atom to which are attached two ethyl radicals and two monovalent hydrolyzable radicals, and the divalent hydrocarbon radicals in the second-mentioned substance are unsubstituted.

14. A composition comprising products of the co-hydrolysis of two substances as claimed in claim 12.

15. A composition comprising products of the hydrolysis of (1) a substance whose molecule consists of a silicon atom to which are attached two ethyl radicals and two monovalent hydrolyzable radicals and (2) a compound of the class consisting of trichlorosilylethylcyclohexyltrichlorosilane, 3-trichlorosilyl-2-methylpropyltriethoxysilane, bis(trichlorosilyl)cyclopentane and 1,6-bis(trichlorosilyl)-2,5-dimethylhexane, in a molar ratio from 99:1 to 55:45.

16. A composition comprising products of the hydrolysis of diethyldichlorosilane and 3-trichlorosilyl-2-methylpropyltriethoxysilane, in a molar ratio from 99:1 to 55:45.

17. A composition comprising products of the hydrolysis of diethyldichlorosilane and bis(trichlorosilyl)cyclopentane, in a molar ratio from 99:1 to 55:45.

18. A composition comprising products of the hydrolysis of diethyldichlorosilane and 1,6-bis-(trichlorsilyl)-2,5-dimethylhexane, in a molar ratio from 99:1 to 55:45.

DAVID B. HATCHER.
RAYMOND H. BUNNELL.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,220 | Rochow | Oct. 7, 1941 |
| 2,352,974 | Rochow | July 4, 1944 |
| 2,379,821 | Miller et al. | July 3, 1945 |
| 2,381,000 | Patnode et al. | Aug. 7, 1945 |
| 2,381,002 | Patnode et al. | Aug. 7, 1945 |
| 2,460,457 | Hyde | Feb. 11, 1949 |
| 2,479,374 | Krieble | Aug. 16, 1949 |
| 2,486,162 | Hyde | Oct. 25, 1949 |
| 2,545,780 | Hatcher et al. | Mar. 20, 1951 |

FOREIGN PATENTS

| Number | Country | Date |
| --- | --- | --- |
| 646,584 | Great Britain | Nov. 22, 1950 |

OTHER REFERENCES

Barry et al.: Journ. Amer. Chem. Soc., vol. 69, November 1947, p. 2916.